W. E. DAVIS.
Lifting Shovel.
No. 40,398. Patented Oct. 27, 1863.
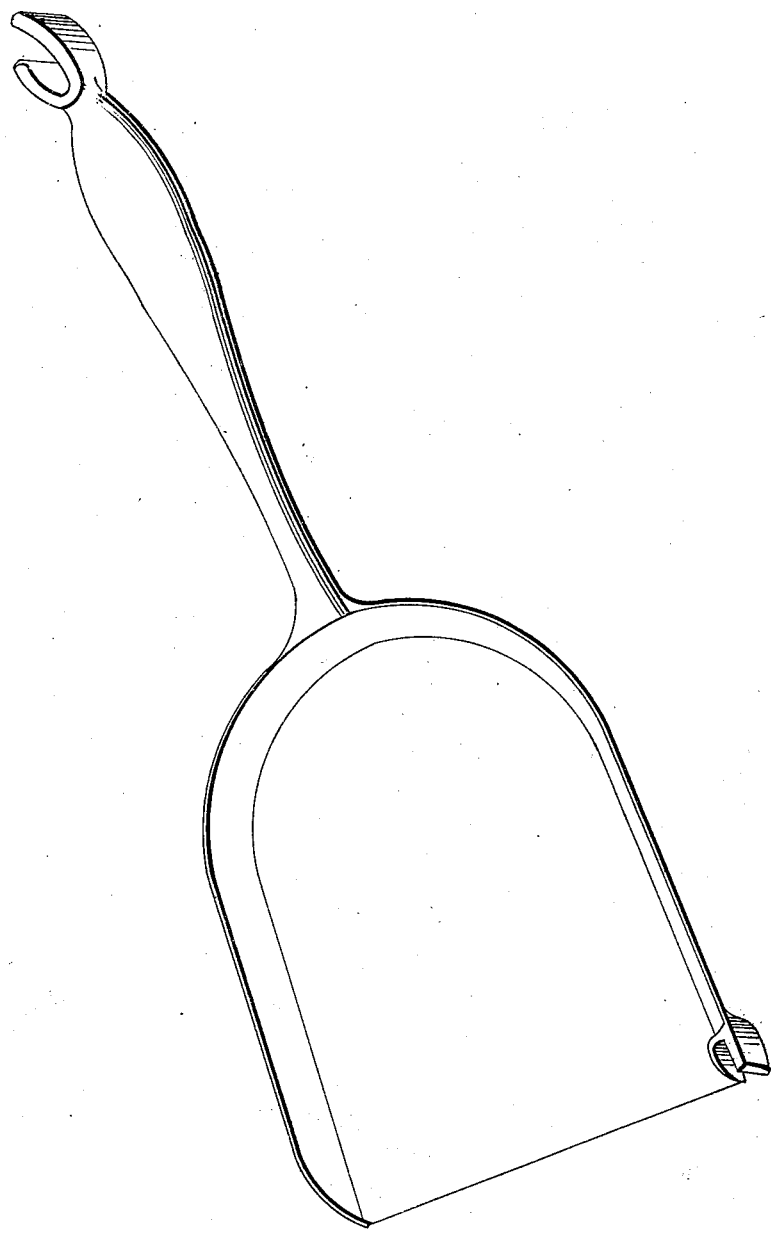

UNITED STATES PATENT OFFICE.

WILLIAM E. DAVIS, OF BROOKLYN, NEW YORK.

IMPROVEMENT IN LIFTING-SHOVELS.

Specification forming part of Letters Patent No. 40,398, dated October 27, 1863.

*To all whom it may concern:*

Be it known that I, WILLIAM E. DAVIS, of Brooklyn, in the county of Kings and State of New York, have invented a new and useful Improvement in Shovels; and I do hereby declare that the following is a full, clear, and exact description of the same, reference being had to the accompanying drawing, making a part of this specification, and to the letters of reference marked thereon.

In placing coal in an ordinary cooking-stove or range, it is first necessary to remove the cover with a lifter, and lay it down to take a shovel with which to handle the coal, and then, in turn, to lay aside the shovel and again take up the lifter, which may have been placed on the stove and become inconveniently hot in the meanwhile, for the purpose of replacing the cover.

The object of my invention is to combine a lifter with a shovel in such a manner, that the same instrument may be conveniently used for both these purposes, which have hitherto required two separate instruments, without materially affecting its efficiency in either lifting the covers or transferring the coal; and it consists in making the shovel with a lip that fits into the places prepared in the covers for the reception of a lifter; and as lifters are sometimes furnished with a pair of lips by which a baking-pan or dish may be held, so also the handle of a shovel made according to my invention may be fitted with a pair of lips or projections for that purpose.

To enable others skilled in the art to which it appertains to make and use my invention, I will proceed to describe its construction and operation, with reference to the drawing, which represents a combined lifter and shovel made according to my said invention.

The shovel-scoop $a\ b\ c\ d$ is made at the corner $c$ with a slot and a lip, $e$, that fits into the recesses for the reception of the end of a lifter with which stove-covers are usually furnished. The sides of the scoop are inclined in the ordinary way, and the lip is made square from the upper edge, so that the full width of the shovel is left unobstructed on its face, and without any projection that will interfere materially with its efficiency as a scoop. The end of the handle $f\ g$ is also provided with a double lip, $h$, which enables it to be applied to any of the purposes for which an ordinary lifter may be used; and it may also be furnished, if desired, with a socket to serve as a handle for shaking out the grate.

It is obvious that the instrument which I have described and illustrated may be used to remove the cover, and also to shift the coal from a scuttle to the stove, and then to replace the cover, in a single series of operations without changing it in the hand.

Having thus described the nature and operation of my said invention, I wish it to be understood that I do not confine myself to the precise shape of the article represented in the drawing, as it may be modified in form without departing from the principle of its construction.

What I claim as my invention, and desire to secure by Letters Patent, is—

The new article of manufacture, substantially as described, consisting of a combined shovel and lifter.

WILLIAM E. DAVIS.

Witnesses:
 FRANCIS SNYDER,
 WM. KEMBLE HALL.